Feb. 11, 1936.  S. R. BERGMAN  2,030,678
DYNAMO-ELECTRIC MACHINE
Filed Aug. 29, 1934
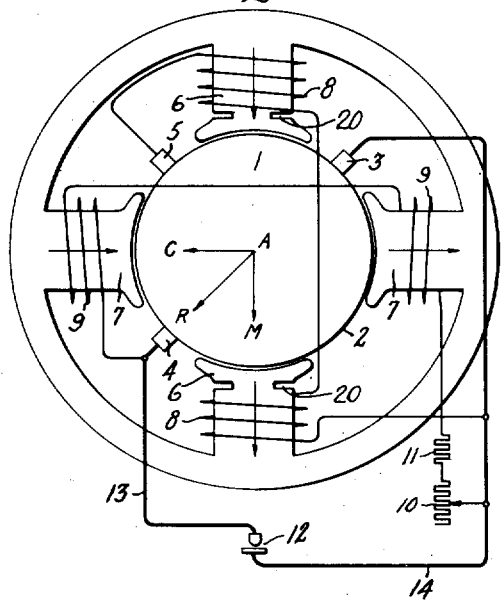
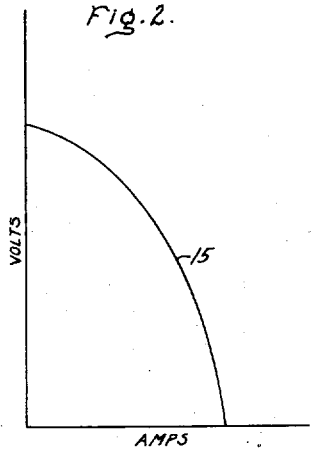
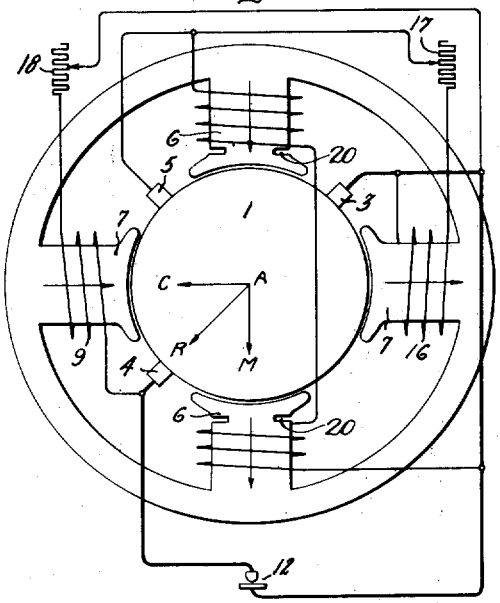
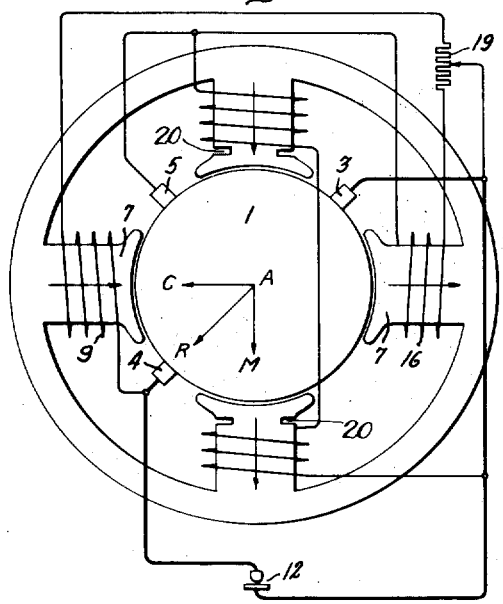
Inventor:
Sven R. Bergman,
by Harry E. Dunham
His Attorney.

Patented Feb. 11, 1936

2,030,678

UNITED STATES PATENT OFFICE 2,030,678

DYNAMO-ELECTRIC MACHINE

Sven R. Bergman, Nahant, Mass., assignor to General Electric Company, a corporation of New York Application August 29, 1934, Serial No. 741,942

12 Claims. (Cl. 171—223)

My invention relates to dynamo-electric machines, and particularly to dynamo-electric machines which supply electrical energy at different potentials depending upon the load.

My invention is especially applicable to dynamo-electric machines which supply electrical energy for arc welding.

In my Patent No. 1,340,004, granted May 11, 1920, I have described and claimed a self-regulating dynamo-electric machine having a voltage characteristic which varies inversely as the current, and the maximum current and voltage of which are limited. The dynamo-electric machine of the present invention is an improvement on the machine of my above patent.

The machine of the above referred to patent is of the commutator type having an $n$ pole armature winding and a field structure comprising two magnetic circuits, that is $2n$ mechanical pole pieces arranged in two sets with an equal number of pole pieces in each set and with pairs of adjacent pole pieces in the separate sets arranged to be of like polarity. At least three brushes are arranged to bear upon the commutator by means of which three electromotive forces are derived from the armature. Two of the brushes are spaced 180 electrical degrees apart and are arranged with respect to the pole pieces so that the voltage between these brushes is dependent on the flux in both sets of pole pieces. One set of pole pieces is arranged to produce a voltage between the third brush and one 180 degree brush, and the other set is arranged to produce a voltage between the third brush and the other 180 degree brush. The voltage between the 180 degree brushes is equal to the algebraic sum of the voltages induced in the armature by the respective sets of pole pieces. One set of pole pieces, hereinafter referred to as the main pole pieces, is arranged to be substantially saturated so that the flux therein is substantially unaffected by armature reaction, and the voltage induced in the armature by this set of pole pieces is substantially constant at any given speed. The other set of pole pieces, hereinafter referred to as the cross pole pieces, is arranged to operate unsaturated so that the flux therein is varied in amount and direction by the armature reaction due to load current, the arrangement being such that the voltage between the load brushes decreases when the load current increases.

In order to regulate the rate at which the voltage between the load brushes increases with an increase in load, a series winding is placed on the cross pole pieces to assist the armature reaction. These series windings are provided with taps so that the number of series turns can be adjusted in order to obtain any desired rate of change in the voltage between the load brushes.

The transformer action between the shunt and series windings on the cross pole pieces introduce transients which affect the dynamic performance of the machine. Furthermore, the series winding adds considerable expense to the generator and adds to the electrical losses. In addition to this, in order to obtain different welding currents or outputs, it is necessary to provide a series winding with taps as noted above, and the necessary tap switch also entails considerable expense.

It is an object of my invention to provide a generator of the type described in my earlier patent, in which the excitation is completely furnished by shunt windings.

It is a further object of my invention to provide an arc welding machine delivering nearly constant current over the welding range.

Further objects of my invention will become apparent from a consideration of the following description taken in connection with the annexed drawing, Fig. 1 of which is a diagrammatic illustration of a welding generator embodying my invention; Fig. 2 of which is the regulation curve of the machine illustrated in Fig. 1, and Figs. 3 and 4 of which are modifications of the generator illustrated in Fig. 1.

Referring to Fig. 1 of the drawing 1 is the armature of a dynamo-electric machine having a commutator 2 on which bear the load brushes 3 and 4 and an auxiliary brush 5. The armature is preferably rotated at substantially constant speed by any well known means (not shown) such, for example, as an induction motor, a synchronous motor, a direct current motor or other driving means.

A field structure having main pole pieces 6 alternating with cross pole pieces 7 surrounds the armature 1. The main pole pieces 6 are arranged to produce a voltage between the auxiliary brush 5 and the load brush 3, and the cross pole pieces 7 are arranged to produce a voltage between the auxiliary brush 5 and the load brush 4. Preferably the voltage between brushes 3 and 5 remains substantially constant and the voltage between brushes 5 and 4 varies with the load current. The voltage between brushes 3 and 4 is equal to the algebraic sum of the voltages between brushes 3 and 5 and 5 and 4.

In order that the voltage produced by main pole pieces 6 in that part of the armature connected between brushes 3 and 5 shall remain substantially constant, the pole pieces 6 are arranged to operate at or near magnetic saturation. This result can be obtained by suitable notching of the pole pieces 6, as indicated at 20, or by providing them with slots which produce saturation in the pole structure where its area is thus reduced. In order that the voltage produced by the cross pole pieces 7 in that part of the armature connected between brushes 5 and 4 shall vary approximately with the load, these pole pieces are arranged to be operated substantially unsaturated, by which is meant the magnetic circuits of these poles only approach saturation when the load circuit is short circuited.

The main pole pieces 6 are excited by shunt field windings 8 which are connected between the auxiliary brush 5 and the load brush 3. The cross pole pieces are excited by shunt windings 9 connected between the load brushes 3 and 4. The amount of current flowing in these exciting windings 9 may be controlled by an adjustable resistance 10 connected in series therewith. A surge current limiting permanent or fixed resistance 11 is also connected in series with the windings 9 to oppose the currents induced in these windings by the transformer action between them and the armature 1. The resistance 11 may be replaced by any suitable impedance for the accomplishment of this desired effect, although it is to be noted that the use of resistance in this circuit decreases its time constant and makes the field windings more responsive to voltage changes across the load brushes 3 and 4. An adjustable resistance connected in circuit with the exciting windings 8 on the main pole pieces 6 may also be provided.

The arc welding equipment indicated at 12 is connected through a load circuit 13 and 14 to the load brushes 3 and 4.

Since the load current is taken from brushes 3 and 4 there exists an armature reaction AR which is substantially in line with these brushes. This armature reaction has been indicated by an arrow AR in the drawing. This armature reaction AR may be resolved into two components AM and AC which have also been indicated in the drawing by arrows AC and AM. Arrows also indicate in the drawing the direction of the flux produced by the windings 8 and 9 on the main and cross pole pieces 6 and 7, respectively.

My invention will be more fully understood from a consideration of the operation of the machine above described.

It is to be noted that the exciting windings 9 on the cross pole pieces 7, which are connected across the load brushes 3 and 4, are arranged to set up a flux in the opposite direction to the flux AC produced in these cross pole pieces by armature reaction. Consequently, as the load current increases the flux in the cross pole pieces 7 is first decreased and then reversed due both to armature reaction and the decreased excitation furnished by windings 9, which are connected across the load brushes 3 and 4 between which the voltage decreases with load. The voltage generated between brushes 3 and 5 remains substantially constant with increase in load current for as main pole pieces 6 are saturated, the component AM of armature reaction will set up very little additional flux therein. The voltage, therefore, between brushes 3 and 5 will remain substantially constant.

The regulation curve 15 of this machine is illustrated in Fig. 2 from which it is to be noted that a substantially constant current is obtained over the welding range.

In order to obtain different welding settings, that is, different outputs of the generator, I may provide an additional winding 16 located on the cross pole pieces 7. This construction is shown in Fig. 3. This winding is connected across the constant potential brushes 3 and 5 and sets up a flux in the cross pole pieces in an opposite direction to the flux produced in these pole pieces by the armature reaction AC. Adjustable resistances 17 and 18 respectively located in circuit with the windings 16 and 9 located on the cross pole pieces are provided for controlling the excitation furnished by these windings. The excitation furnished by winding 9 is variable with the load as has already been pointed out above. The excitation furnished by winding 16 is constant, being connected across the constant potential brushes 3 and 5. By decreasing the excitation furnished by winding 9 and, at the same time, strengthening the excitation furnished by winding 16 the output of the generator may be increased due to the fact that the total excitation is more constant. If, on the other hand, the excitation furnished by winding 9 is strengthened at the same time that the excitation furnished by winding 16 is weakened, the output of the generator may be decreased. Thus, any desired welding current may be obtained by such a relative shift of the mixed excitation furnished by windings 9 and 16. A single rheostat 19 illustrated in Fig. 4 may be used for simultaneously varying in opposite senses the excitation furnished by windings 16 and 9.

When the additional winding 16 is employed for obtaining different welding settings the regulation curve of the machine will depart from the substantially constant current characteristics illustrated in Fig. 2. For the low welding current settings when most of the excitation is taken from the load brushes a substantially constant current characteristic will be obtained, but for the higher welding current settings the excitation of the machine will be more constant on the cross poles and the welding current will not droop as much as illustrated in the characteristic curve of Fig. 2. For the higher current settings the characteristic will be more like that obtained with the machine constructed in accordance with the teachings of my Patent No. 1,340,004.

It is to be noted that the generator of my present invention is completely excited by shunt windings, and is particularly adapted for arc welding operation. Furthermore, by reason of the resistance included in the circuit of the exciting winding 9 of the machine, its time constant is reduced and the machine operates consequently with dynamic stability. This stability can be further increased by laminating the polar structure of the machine. It is of course apparent that the field windings need not be located on the pole pieces as illustrated where for convenience the windings 9 and 16 on the cross pole pieces have been placed on separate pole pieces. These windings may be placed adjacent one another on the same pole pieces.

In applying my invention it may be necessary to employ commutating poles in order to reduce sparking at the load brushes. Although such commutating poles have not been referred to in describing my invention, it is to be understood that they may be used without departing from my invention. Commutating poles do not interfere with the regulation of the machine and would be added merely to eliminate sparking at the brushes.

Certain features of my invention are capable of use in other applications than arc welding, and I desire to cover such modifications and variations thereof as fall within the scope of my invention which is set forth in the appended claims.

What I claim as new and desire to secure by Letters Patent of the United States is:

1. In a dynamo-electric machine, an $n$ pole armature winding, a field structure comprising $2n$ mechanical field pole pieces arranged in two sets with an equal number of pole pieces in each set, means for providing a substantially magnetically saturated path in the magnetic circuit of one of said sets of pole pieces so that the flux in said set is unaffected by armature reaction, the magnetic circuit of the other of said sets of pole pieces being constructed and arranged so that the flux therein is varied by armature reaction, adjacent pole pieces of separate sets being arranged in pairs of like polarity, load brushes and an auxiliary brush cooperating with said armature winding, said load brushes being arranged with respect to said pole pieces so that the voltage difference between said brushes is dependent on the flux in both of said sets of pole pieces, said auxiliary brush being arranged with respect to said pole pieces so that the voltage between said auxiliary brush and one of said load brushes is dependent on the flux in said magnetically saturated set of pole pieces, a shunt exciting winding on said saturated set of pole pieces connected between said auxiliary brush and one of said load brushes and across that portion of the armature which has a voltage induced therein by said set of saturated pole pieces, and a shunt exciting winding on said other set of pole pieces connected across said load brushes and arranged to set up a flux in an opposite direction to the flux produced in said other set of pole pieces by armature reaction.

2. In a dynamo-electric machine, an armature provided with a commutator, load brushes and an auxiliary brush bearing on said commutator, a field magnet structure having two sets of field pole pieces, means for providing a substantially magnetically saturated path in the magnetic circuit of one of said sets of pole pieces so that the flux in said set is unaffected by armature reaction and produces a constant voltage between said auxiliary brush and one of said load brushes, the magnetic circuit of the other of said sets of pole pieces being constructed and arranged so that the flux therein is varied by the armature reaction and produces a variable voltage between said auxiliary brush and the other of said load brushes, the voltage between said load brushes being equal to the algebraic sum of the voltage between said auxiliary brush and each of said load brushes, a shunt exciting winding for said magnetically saturated pole pieces connected between said auxiliary brush and one of said load brushes and across that portion of the armature which has a voltage induced therein by said saturated pole pieces, and a shunt exciting winding for said other set of pole pieces connected between said load brushes.

3. A dynamo-electric machine comprising an armature provided with a commutator, load brushes and an auxiliary brush bearing on said commutator, a field magnet structure having alternate main pole pieces and cross pole pieces, said main pole pieces being constructed and arranged so that the flux therein is substantially unaffected by armature reaction and said cross pole pieces being constructed and arranged so that the flux therein is varied by armature reaction, an exciting winding for said main pole pieces connected between said auxiliary brush and one of said load brushes and across that portion of the armature which has a voltage induced therein by flux produced by said main pole pieces, an exciting winding for said cross pole pieces connected between said load brushes, the flux produced by said main pole pieces inducing in the armature between one of said load brushes and said auxiliary brush a substantially constant voltage and the flux in said cross pole pieces inducing in the armature between said auxiliary brush and the other of said load brushes a variable voltage, the arrangement being such that the voltage between said load brushes is equal to the algebraic sum of the voltages between said auxiliary brush and each of said load brushes, and a shunt exciting winding for said unsaturated poles connected between said load brushes.

4. A dynamo-electric machine comprising an armature winding, a field structure having main pole pieces constructed and arranged so that the flux therein is unaffected by armature reaction alternating with cross pole pieces constructed and arranged so that the flux is varied by armature reaction, adjacent main and cross pole pieces being arranged in pairs having the same polarity, load brushes and an auxiliary brush cooperating with said armature winding, said load brushes being arranged with respect to said pole pieces so that the voltage between said load brushes at no load is dependent on the flux of adjacent main and cross pole pieces of like polarity, said auxiliary brush being arranged with respect to said pole pieces so that the voltage between said auxiliary brush and one of said load brushes is dependent on the flux in said main pole pieces, and the voltage between said auxiliary brush and the other of said load brushes is dependent on the flux in said cross pole pieces, a shunt exciting winding for said main pole pieces connected between said auxiliary brush and one of said load brushes and across that portion of the armature which has a voltage induced therein by the flux produced by said main pole pieces, and a shunt exciting winding on said cross pole pieces connected across said load brushes and arranged to set up a flux in an opposite direction to the flux produced in said cross pole pieces by armature reaction.

5. A dynamo-electric machine comprising an armature winding, a field structure having main pole pieces constructed and arranged so that the flux produced therein is unaffected by armature reaction alternating with cross pole pieces constructed and arranged so that the flux therein is varied by armature reaction, adjacent main and cross pole pieces being arranged in pairs of like polarity, load brushes and an auxiliary brush cooperating with said armature winding, said load brushes being arranged with respect to said pole pieces so that the voltage between said load brushes at no load is dependent on the flux of adjacent main and cross pole pieces of like polarity, said auxiliary brush being arranged with respect to said pole pieces so that the voltage between said auxiliary brush and one of said load brushes is dependent on the flux in said main pole pieces and the voltage between said auxiliary brush and the other of said load brushes is dependent on the flux in said cross pole pieces, a shunt exciting winding for said main pole pieces connected between said auxiliary brush and one of said load brushes and across that portion of the armature which has a voltage induced therein by said main pole pieces, and a shunt exciting winding on said cross pole pieces connected across said load brushes and arranged to set up a flux in an opposite direction to the flux produced in said cross pole pieces by armature reaction, the impedance of the exciting winding circuit for said cross pole pieces being sufficient to limit to a small value the current flow therein due to the transformer action between said cross pole piece exciting winding and the armature of said machine.

6. A dynamo-electric machine comprising an armature winding, a field structure having main pole pieces constructed and arranged so that the flux produced therein is unaffected by armature reaction alternating with cross pole pieces constructed and arranged so that the flux therein is varied by armature reaction, adjacent main and cross pole pieces being arranged in pairs of like polarity, load brushes and an auxiliary brush cooperating with said armature winding, said load brushes being arranged with respect to said pole pieces so that the voltage between said load brushes at no load is dependent on the flux of adjacent main and cross pole pieces of like polarity, said auxiliary brush being arranged with respect to said pole pieces so that the voltage between said auxiliary brush and one of said load brushes is dependent on the flux in said main pole pieces and the voltage between said auxiliary brush and the other of said load brushes is dependent on the flux in said cross pole pieces, a shunt exciting winding for said main pole pieces connected between said auxiliary brush and one of said load brushes and across that portion of the armature which has a voltage induced therein by said main pole pieces, a shunt exciting winding on said cross pole pieces connected across said load brushes and arranged to set up a flux in an opposite direction to the flux produced in said cross pole pieces by armature reaction, and a permanent surge current limiting resistance connected in series with said exciting winding on said cross pole pieces.

7. A dynamo-electric machine comprising an armature winding, a field structure having main pole pieces constructed and arranged so that the flux therein is unaffected by armature reaction alternating with cross pole pieces constructed and arranged so that the flux therein is varied by armature reaction, adjacent main and cross pole pieces being arranged in pairs of like polarity, load brushes and an auxiliary brush cooperating with said armature winding, said load brushes being arranged with respect to said pole pieces so that the voltage between said load brushes at no load is dependent on the flux of adjacent main and cross pole pieces of like polarity, said auxiliary brush being arranged with respect to said pole pieces so that the voltage between said auxiliary brush and one of said load brushes is dependent on the flux in said main pole pieces and the voltage between said auxiliary brush and the other of said load brushes is dependent on the flux in said cross pole pieces, shunt exciting windings for said main pole pieces and said cross pole pieces connected between said auxiliary brush and one of said load brushes and across that portion of the armature which has a voltage induced therein by said main pole pieces, and a second shunt exciting winding for said cross pole pieces connected across said load brushes, the exciting windings on said cross pole pieces being arranged to set up a flux in an opposite direction to the flux produced in said cross pole pieces by armature reaction.

8. A dynamo-electric machine comprising an armature winding, a field structure having main pole pieces constructed and arranged so that the flux therein is unaffected by armature reaction alternating with cross pole pieces constructed and arranged so that the flux therein is varied by armature reaction, adjacent main and cross pole pieces being arranged in pairs of like polarity, load brushes and an auxiliary brush cooperating with said armature winding, said load brushes being arranged with respect to said pole pieces so that the voltage between said load brushes at no load is dependent on the flux of adjacent main and cross pole pieces of like polarity, said auxiliary brush being arranged with respect to said pole pieces so that the voltage between said auxiliary brush and one of said load brushes is dependent on the flux in said main pole pieces and the voltage between said auxiliary brush and the other of said load brushes is dependent on the flux in said cross pole pieces, shunt exciting windings for said main pole pieces and said cross pole pieces connected between said auxiliary brush and one of said load brushes and across that portion of the armature which has a voltage induced therein by said main pole pieces, a second shunt exciting winding on said cross pole pieces connected across said load brushes, and means for independently controlling the flow of current in said exciting windings on said cross pole pieces, said exciting windings being arranged to set up a flux in said cross pole pieces in opposition to the flux produced therein by armature reaction.

9. A dynamo-electric machine comprising an armature winding, a field structure having main pole pieces constructed and arranged so that the flux therein is unaffected by armature reaction alternating with cross pole pieces constructed and arranged so that the flux therein is varied by armature reaction, adjacent main and cross pole pieces being arranged in pairs of like polarity, load brushes and an auxiliary brush cooperating with said armature winding, said load brushes being arranged with respect to said pole pieces so that the voltage between said load brushes at no load is dependent on the flux of adjacent main and cross pole pieces of like polarity, said auxiliary brush being arranged with respect to said pole pieces so that the voltage between said auxiliary brush and one of said load brushes is dependent on the flux in said main pole pieces and the voltage between said auxiliary brush and the other of said load brushes is dependent on the flux in said cross pole pieces, a shunt exciting winding for said main pole pieces connected between said auxiliary brush and one of said load brushes and across that portion of the armature which has a voltage induced therein by said main pole pieces, shunt exciting windings for said cross poles one of which is connected in the same manner as the exciting winding for said main pole pieces, and the other of which is connected across said load brushes, both of said windings being arranged to set up a flux in an opposite direction to the flux produced in said cross pole pieces by armature reaction, and means for simultaneously controlling in opposite senses the flows of current through said exciting windings on said cross pole pieces.

10. A dynamo-electric machine having two field structure magnetic circuits, an armature provided with a commutator, load brushes and an auxiliary brush associated with said commutator, means for producing a substantially constant difference of electrical potential between said auxiliary brush and one of said load brushes, means for producing a variable difference of electrical potential between said load brushes equal to the algebraic sum of the voltages between said auxiliary brush and each of said load brushes, means for exciting one of said magnetic circuits from said brushes of constant potential difference, and means for applying a mixed excitation to the other of said magnetic circuits, one part of said mixed excitation being obtained from said brushes of constant potential difference and the other part from said load brushes.

11. A dynamo-electric machine having two field magnetic circuits, an armature provided with a commutator, load brushes and an auxiliary brush associated with said commutator, means utilizing one of said field magnetic circuits for producing a substantially constant difference of electrical potential between said auxiliary brush and one of said load brushes, means utilizing the other of said field magnetic circuits for producing a variable difference of electrical potential between said load brushes equal to the algebraic sum of the voltages between said auxiliary brush and each of said load brushes, means for exciting one of said magnetic circuits from said brushes of constant potential difference, and means for applying mixed excitation to said other of said magnetic circuits, one part of said mixed excitation being obtained from said brushes of constant potential and the other part from said load brushes.

12. A dynamo-electric machine having two field magnetic circuits, an armature provided with a commutator, load brushes and an auxiliary brush associated with said commutator, means including a field exciting winding connected across said auxiliary brush and one of said load brushes arranged to magnetically excite one of said field magnetic circuits for producing a substantially constant difference of electrical potential between said auxiliary brush and one of said load brushes, means including a second field exciting winding connected across said load brushes arranged to magnetically excite the other of said field magnetic circuits for producing a variable difference of electrical potential between said load brushes equal to the algebraic sum of the voltages between said auxiliary brush and each of said load brushes, and means including an impedance connected in series with said second field exciting winding for limiting the flow of electric current through said second field exciting winding due to the transformer action between said second field exciting winding and said armature.

SVEN R. BERGMAN.